US012649810B2

(12) United States Patent
Tanaka et al.

(10) Patent No.: US 12,649,810 B2
(45) Date of Patent: Jun. 9, 2026

(54) HOLLOW FINE PARTICLE PRODUCTION METHOD AND HOLLOW FINE PARTICLES

(71) Applicant: DAIKIN INDUSTRIES, LTD., Osaka (JP)

(72) Inventors: Yoshito Tanaka, Osaka (JP); Emi Yamamoto, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 791 days.

(21) Appl. No.: 17/519,937

(22) Filed: Nov. 5, 2021

(65) Prior Publication Data

US 2022/0056178 A1 Feb. 24, 2022

Related U.S. Application Data

(63) Continuation of application No. PCT/JP2020/015368, filed on Apr. 3, 2020.

(30) Foreign Application Priority Data

May 9, 2019 (JP) ................................ 2019-089002

(51) Int. Cl.

| | |
|---|---|
| ***C08F 220/24*** | (2006.01) |
| ***B01J 13/18*** | (2006.01) |
| ***C08F 222/10*** | (2006.01) |
| ***H01B 1/12*** | (2006.01) |

(52) U.S. Cl.

CPC ............ *C08F 220/24* (2013.01); *B01J 13/18* (2013.01); *C08F 222/102* (2020.02); *H01B 1/12* (2013.01)

(58) Field of Classification Search

CPC ..... C08F 220/24; C08F 222/102; B01J 13/18; H01B 1/12; C09D 163/00; C08L 33/16

See application file for complete search history.

(56) References Cited

U.S. PATENT DOCUMENTS

2002/0156148 A1* 10/2002 Arase ...................... G03F 7/038 523/1

2005/0113505 A1* 5/2005 Watanabe ............ C08F 257/02 524/458

(Continued)

FOREIGN PATENT DOCUMENTS

JP 2001240627 A * 9/2001

JP 2004-190038 A 7/2004

(Continued)

OTHER PUBLICATIONS

Machine translation of JP 2010-167410 (Year: 2010).*

(Continued)

*Primary Examiner* — Doris L Lee

(74) *Attorney, Agent, or Firm* — Sughrue Mion, PLLC

(57) ABSTRACT

A method for producing hollow fine particles containing a fluorine-containing resin and having a large average particle size. The method includes a step A of providing hollow fine particles by dispersing a solution containing a fluorine-containing monomer, an oil-soluble initiator, and a non-polymerizable solvent in water containing a fluorine-containing surfactant and thereby polymerizing the fluorine-containing monomer. Also disclosed are hollow fine particles including a fluorine-containing resin and having an average particle size of 70 nm or greater and 10 μm or smaller. The hollow fine particles each have a porosity of 5% by volume or higher, and the fluorine-containing resin contains a polymerized unit based on a fluorine-containing monomer and a polymerized unit based on a crosslinkable monomer.

12 Claims, 1 Drawing Sheet

(56) References Cited

U.S. PATENT DOCUMENTS

| | | | | |
|---|---|---|---|---|
| 2007/0251422 | A1* | 11/2007 | Maenaka | C09D 7/70 524/1 |
| 2016/0375657 | A1 | 12/2016 | Park et al. | |
| 2018/0217533 | A1 | 8/2018 | Sakimura et al. | |

FOREIGN PATENT DOCUMENTS

| | | | | |
|---|---|---|---|---|
| JP | 2005-213366 | A | | 8/2005 |
| JP | 2010167410 | A | * | 8/2010 |
| JP | 2012-201819 | A | | 10/2012 |
| JP | 2017-525585 | A | | 9/2017 |
| JP | 2018-124435 | A | | 8/2018 |
| WO | 2005/097870 | A1 | | 10/2005 |

OTHER PUBLICATIONS

Machine translation of JP_2001240627 (Year: 2001).*
Extended European Search Report issued Dec. 21, 2022 in counterpart European Application No. 20801443.1.
Extended European Search Report dated Mar. 22, 2023 from the European Patent Office in counterpart EP Application No. 20801443.1.
International Preliminary Report on Patentability (with translation of Written Opinion) dated Nov. 2, 2021, issued by the International Bureau in application No. PCT/JP2020/015368.
Partial European Search Report issued Dec. 21, 2022 in European Application No. 20801443.1.
International Search Report for PCT/JP2020/015368, dated Jun. 30, 2020.

* cited by examiner

HOLLOW FINE PARTICLE PRODUCTION METHOD AND HOLLOW FINE PARTICLES

CROSS REFERENCE TO RELATED APPLICATIONS

This application is a Rule 53(b) Continuation of International Application No. PCT/JP2020/015368 filed Apr. 3, 2020, claiming priority based on Japanese Patent Application No. 2019-089002 filed May 9, 2019, the respective disclosures of which are incorporated herein by reference in their entirety.

TECHNICAL FIELD

The disclosure relates to methods for producing hollow fine particles and to hollow fine particles.

BACKGROUND ART

Hollow fine particles each having a hole therein are excellent for achievement of properties such as light weight, low refractive index, and low dielectricity, and are therefore examined in various studies. Such hollow fine particles conventionally used are inorganic particles, but inorganic particles are heavy in weight. Use of hollow fine particles formed from a polymer thus has been studied instead of inorganic particles.

For example, Patent Literature 1 discloses hollow fine resin particles containing a resin having a fluorine atom, wherein the hollow resin fine particles have an average particle size of 10 to 200 nm, a porosity of 10% or higher, and a refractive index of 1.30 or lower.

Patent Literature 2 discloses hollow fine polymer particles including a shell and a hollow, wherein the shell has a single layer structure containing a polymer or copolymer of at least one crosslinkable monomer.

CITATION LIST

Patent Literature

Patent Literature 1: JP 2005-213366 A
Patent Literature 2: JP 2004-190038 A

SUMMARY

The disclosure relates to a method for producing hollow fine particles containing a fluorine-containing resin, the method including:

a step A of providing hollow fine particles by dispersing a solution containing a fluorine-containing monomer, an oil-soluble initiator, and a non-polymerizable solvent in water containing a fluorine-containing surfactant and thereby polymerizing the fluorine-containing monomer.

Advantageous Effects

The method for producing hollow fine particles of the disclosure can produce hollow fine particles having a large average particle size. The hollow fine particles of the disclosure can have a large average particle size even though containing a fluorine-containing resin.

DESCRIPTION OF EMBODIMENTS

Figure 1:
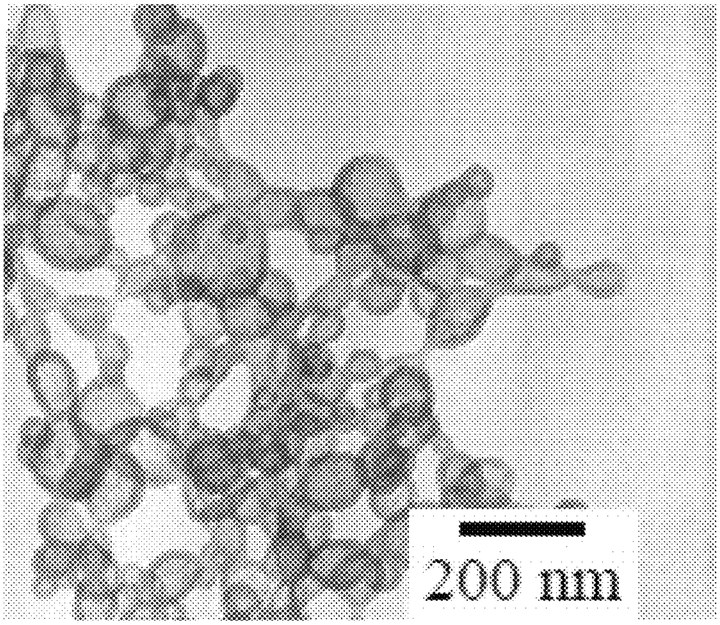
FIG. 1 is a transmission electron microscopic (TEM) image of hollow fine particles obtained in Example 1.

The disclosure relates to a method for producing hollow fine particles containing a fluorine-containing resin, the method including:

a step A of providing hollow fine particles by dispersing a solution containing a fluorine-containing monomer, an oil-soluble initiator, and a non-polymerizable solvent in water containing a fluorine-containing surfactant and thereby polymerizing the fluorine-containing monomer.

The disclosers performed studies to find that conventional methods for producing hollow fine particles containing a fluororesin by polymerizing a fluorine-containing monomer fail to provide hollow fine particles having a large average particle size. The disclosers further performed studies to find that combination of a specific initiator, solvent, and surfactant allows hollow fine particles even containing a fluororesin to have a large average particle size. As a result, they completed the method for producing hollow fine particles of the disclosure.

The step A includes providing hollow fine particles by dispersing a solution containing a fluorine-containing monomer, an oil-soluble initiator, and a non-polymerizable solvent in water containing a fluorine-containing surfactant and thereby polymerizing the fluorine-containing monomer. Dispersing the solution in this manner can form droplets, and the fluorine-containing monomer can be polymerized in these droplets. Such a method for synthesizing hollow fine particles is known as phase separation. The phase separation is described in, for example, Tiarks, F., Landfester, K., and Antonietti, M., Langmuir, 2001, 17, 908. The step A can be regarded as a step of providing hollow fine particles by polymerizing a fluorine-containing monomer by phase separation.

The step A may be any step in which at least a fluorine-containing monomer is polymerized. A fluorine-containing monomer alone may be polymerized, or a fluorine-containing monomer and a monomer copolymerizable with the fluorine-containing monomer may be polymerized. Accordingly, the step A may be a step in which a fluorine-containing monomer and a monomer copolymerizable with the fluorine-containing monomer are polymerized, and the solution may contain a fluorine-containing monomer, a monomer copolymerizable with the fluorine-containing monomer, an oil-soluble initiator, and a non-polymerizable solvent.

The fluorine-containing monomer preferably includes at least one selected from the group consisting of a fluorine-containing acrylic monomer and a fluorine-containing styrene monomer, and is more preferably a fluorine-containing acrylic monomer. Preferred is at least one selected from the group consisting of a fluoroalkyl acrylate, a fluoroalkyl methacrylate, a 2-fluoro fluoroalkyl acrylate, and a 2-chloro fluoroalkyl acrylate.

Examples of the fluoroalkyl methacrylate include
$CH_2{=}C(CH_3)COOCH_2CF_3$ (3FMA),
$CH_2{=}C(CH_3)COOCH_2CF_2CF_2H$ (4FMA),
$CH_2{=}C(CH_3)COOCH_2CF_2CF_3$ (5FMA),
$CH_2{=}C(CH_3)COOCH_2CF_2CFHCF_3$ (6FMA),
$CH_2{=}C(CH_3)COOCH_2(CF_2)_3CF_2H$ (8FMA),
$CH_2{=}C(CH_3)COOCH_2CH_2(CF_2)_3CF_3$ (9FMA),
$CH_2{=}C(CH_3)COOCH_2(CF_2)_5CF_2H$ (12FMA),
$CH_2{=}C(CH_3)COOCH_2CH_2(CF_2)_5CF_3$ (13FMA),
$CH_2{=}C(CH_3)COOCH(CF_3)_2$ (HFIP-MA), $CH_2{=}C(CH_3)COOCH_2CCH_3(CF_3)_2$ (6FNP-MA), and
$CH_2{=}C(CH_3)COOCH_2CF(CF_3)OCF_2CF_2CF_3$ (6FOn0-MA), as well as corresponding acrylates, 2-fluoro acrylates, and 2-chloro acrylates of these.

Examples of the 2-fluoro fluoroalkyl acrylate include
$CH_2{=}CFCOOCH_2CF_2CF_2H$ (4FFA),
$CH_2{=}CFCOOCH_2CF_2CF_3$ (5FFA),
$CH_2{=}CFCOOCH_2(CF_2)_3CF_2H$ (8FFA),
$CH_2{=}CFCOOCH_2CH_2(CF_2)_3CF_3$ (9FFA),
$CH_2{=}CFCOOCH_2(CF_2)_5CF_2H$ (12FFA),
$CH_2{=}CFCOOCH_2CH_2(CF_2)_5CF_3$ (13FFA),
$CH_2{=}CFCOOCH(CF_3)_2$ (HFIP-FA), and
$CH_2{=}CFCOOCH_2CCH_3(CF_3)_2$ (6FNP-FA).

Examples of the 2-chloro fluoroalkyl acrylate include
$CH_2{=}C(Cl)COOCH_2CH_2(CF_2)_3CF_3$ (9FCLA) and
$CH_2{=}C(Cl)COOCH_2CH_2(CF_2)_5CF_3$ (13FCLA).

Examples of the fluoroalkyl acrylate include
$CH_2{=}CHCOOCH_2(CF_2)_3CF_2H$ (8FA),
$CH_2{=}CHCOOCH_2CH_2(CF_2)_3CF_3$ (9FA),
$CH_2{=}CHCOOCH_2(CF_2)_5CF_2H$ (12FA),
$CH_2{=}CHCOOCH_2CH_2(CF_2)_5CF_3$ (13FA),
$CH_2{=}CHCOOCH(CF_3)_2$ (HFIP-A), and
$CH_2{=}CHCOOCH_2CCH_3(CF_3)_2$ (6FNP-A).

In particular, the fluorine-containing monomer preferably includes at least one selected from the group consisting of 8FMA, 9FMA, 13FMA, 6FNP-MA, 8FFA, 9FFA, 13FFA, 6FNP-FA, HFIP-FA, 9FCLA, 13FCLA, 13FA, and 6FNP-A because they have a high fluorine content and a homopolymer thereof has a high glass transition temperature (Tg). More preferred is at least one selected from the group consisting of 13FMA, 6FNP-FA, and HFIP-FA.

Examples of the monomer copolymerizable with the fluorine-containing monomer include a crosslinkable monomer and a fluorine-free monomer other than crosslinkable monomers.

Examples of the crosslinkable monomer include a multifunctional monomer containing two or more (especially, 2 to 4) polymerizable reactive groups, particularly polymerizable double bonds. The presence of a multifunctional monomer allows the resulting hollow fine particles to have improved strength. The solution preferably contains a crosslinkable monomer.

Examples of the multifunctional monomer include di(meth)acrylates such as ethylene glycol di(meth)acrylate, diethylene glycol di(meth)acrylate, triethylene glycol di(meth)acrylate, 1,6-hexanediol di(meth)acrylate, and trimethylolpropane di(meth)acrylate; tri(meth)acrylates such as trimethylolpropane tri(meth)acrylate, ethylene oxide-modified trimethylolpropane tri(meth)acrylate, and pentaerythritol tri(meth)acrylate; diallyl compounds or triallyl compounds such as pentaerythritol tetra(meth)acrylate, dipentaerythritol hexa(meth)acrylate, diallyl phthalate, diallyl maleate, diallyl fumarate, diallyl succinate, and triallyl isocyanurate; and divinyl compounds such as divinylbenzene and butadiene.

Preferred among these is at least one selected from the group consisting of a di(meth)acrylate, a tri(meth)acrylate, and a divinyl compound, and preferred is at least one selected from the group consisting of ethylene glycol di(meth)acrylate, trimethylolpropane tri(meth)acrylate, and divinylbenzene. One of these may be used alone or two or more of these may be used in the form of mixture.

Examples of the fluorine-free monomer other than crosslinkable monomers include, but are not limited to, a monofunctional monomer that does not contain a fluorine atom but contains one polymerizable reactive group.

Examples of the monofunctional monomer include alkyl (meth)acrylates such as methyl (meth)acrylate, ethyl (meth)acrylate, propyl (meth)acrylate, butyl (meth)acrylate, cumyl (meth)acrylate, cyclohexyl (meth)acrylate, myristyl (meth)acrylate, palmityl (meth)acrylate, stearyl (meth)acrylate, lauryl (meth)acrylate, and isobornyl (meth)acrylate; polar group-containing (meth)acrylic monomers such as (meth)acrylonitrile, (meth)acrylamide, (meth)acrylic acid, glycidyl (meth)acrylate, 2-hydroxyethyl methacrylate, and 2-hydroxypropyl methacrylate; aromatic vinyl monomers such as styrene, α-methylstyrene, p-methylstyrene, and p-chlorostyrene; vinyl esters such as vinyl acetate and vinyl propionate; halogen-containing monomers such as vinyl chloride and vinylidene chloride; vinylpyridine, 2-acryloyloxyethylphthalic acid, itaconic acid, fumaric acid, ethylene, propylene, and a polydimethylsiloxane macromonomer. Preferred among these is at least one selected from the group consisting of methyl methacrylate, 2-hydroxyethyl methacrylate, cyclohexyl methacrylate, and isobornyl methacrylate because they have high miscibility with the fluorine-containing monomer and a high Tg.

In the step A, the monomer(s) is/are preferably used in an amount of 0.1 to 10 parts by mass, more preferably 0.5 to 5 parts by mass, still more preferably 0.8 to 3.5 parts by mass, relative to 1 part by mass of the non-polymerizable solvent.

When a fluorine-containing monomer alone is polymerized, the amount of the monomer(s) used means the amount of the fluorine-containing monomer. When a fluorine-containing monomer and a monomer copolymerizable with the fluorine-containing monomer are polymerized, the amount of the monomer(s) used means the sum of the amounts of the fluorine-containing monomer and the monomer copolymerizable with the fluorine-containing monomer.

The proportions of the fluorine-containing monomer and the monomer copolymerizable with the fluorine-containing monomer (crosslinkable monomer and fluorine-free monomer) are set as appropriate in accordance with the target fluorine-containing resin.

The non-polymerizable solvent used may be a solvent that can dissolve a fluorine-containing monomer, an optional monomer copolymerizable with the fluorine-containing monomer, and an oil-soluble initiator and that has low miscibility with the resulting fluorine-containing resin. Low miscibility with the resulting fluorine-containing resin can promote phase separation of the resulting fluorine-containing resin, which enables production of hollow fine particles by phase separation.

The non-polymerizable solvent is more preferably a solvent that can dissolve a fluorine-containing monomer, an optional monomer copolymerizable with the fluorine-containing monomer, and an oil-soluble initiator and that does not dissolve the resulting fluorine-containing resin.

The non-polymerizable solvent used may be a solvent that has a feature of low miscibility with the fluorine-containing resin and that satisfies the relationship $\gamma^X \geq \gamma^P$, wherein $\gamma^X$ represents the interfacial tension between the non-polymerizable solvent and water, and $\gamma^P$ represents the interfacial tension (mN/m) between water and a surface that adsorbs a polymer obtainable by polymerization using a solution prepared by dissolving a fluorine-containing monomer (and an optional monomer copolymerizable with the fluorine-containing monomer) in the non-polymerizable solvent under the conditions of the production method of the disclosure.

For example, the non-polymerizable solvent is preferably a solvent that is in the form of liquid at the polymerization temperature of the monomer(s) (a fluorine-containing monomer, or a fluorine-containing monomer and a monomer copolymerizable with the fluorine-containing monomer), that is miscible with the monomer(s), that does not react with the monomer(s), and that can be easily evaporated by, for example, heating. Preferred examples thereof include organic solvents such as butane, pentane, hexane, hexadecane, cyclohexane, toluene, xylene, ethyl acetate, methyl chloride, methylene chloride, chloroform, and carbon tetrachloride. If having low miscibility with the fluorine-containing resin, fluorine-containing solvents are also preferred such as fluorine-containing alkanes, fluorine-containing haloalkanes, fluorine-containing aromatic compounds, and fluorine-containing ethers (e.g., hydrofluoroether (HFE)). Preferred examples thereof include perfluorohexane, 1,3-trifluoromethylbenzene, and perfluorotriheptylamine. In order to produce hollow fine particles having a single-hole structure, the non-polymerizable solvent may be more preferably a C8-C18, preferably C12-C18, saturated hydrocarbon. The non-polymerizable solvent particularly preferably includes at least one selected from the group consisting of hexadecane, dodecane, tridecane, tetradecane, and pentadecane, and is more preferably hexadecane.

The production method of the disclosure can provide both a single-hole structure and a porous structure in accordance with the type of the non-polymerizable solvent. The reason why a porous structure is formed or a single-hole structure is formed is not clear. With regard to the combination of the resulting fluorine-containing resin and the solvent, a completely non-miscible system provides a single-hole structure while a slightly miscible system provides a porous structure.

The completely non-miscible system refers to any system in which the resulting fluorine-containing resin shows no visually observable swelling after it is placed in a non-polymerizable solvent at a concentration of 5% by mass and at the polymerization temperature for six hours. For example, use of a saturated hydrocarbon as the non-polymerizable solvent can provide hollow fine particles having a single-hole structure.

The non-polymerizable solvent may be used in an amount selected as appropriate from a wide range, and is commonly 0.1 to 10 parts by mass, preferably 0.5 to 5 parts by mass, relative to 1 part by mass of the monomer(s) (i.e., a fluorine-containing monomer, or a fluorine-containing monomer and a monomer copolymerizable with the fluorine-containing monomer).

The oil-soluble initiator may be any initiator that is oil-soluble and that initiates polymerization of a fluorine-containing monomer (or a fluorine-containing monomer and a monomer copolymerizable with the fluorine-containing monomer) in droplets formed by dispersing the solution in water, and those conventionally used may be used.

Examples thereof include those soluble in the monomer, including azo compounds such as azobisisobutyronitrile, 2,2'-azobis(2-methylbutyronitrile), 2,2'-azobis(4-methoxy-2,4-dimethylvaleronitrile), and 2,2'-azobis(N-butyl-2-methylpropionamide), and peroxides such as cumene hydroperoxide, t-butyl hydroperoxide, dicumyl peroxide, di-t-butyl peroxide, benzoyl peroxide, and lauroyl peroxide, which are radical polymerization initiators. A photopolymerization initiator that initiates polymerization by light such as ultraviolet rays may also be used. The photopolymerization initiator may be any initiator that is oil-soluble, and those conventionally used may be used.

The oil-soluble initiator preferably includes at least one selected from the group consisting of azo compounds, is preferably an azo compound, and preferably includes at least one selected from the group consisting of azoisobutyronitrile and 2,2'-azobis(2-methylbutyronitrile).

An example of the fluorine-containing surfactant is a fluorine-containing anionic surfactant.

For example, the fluorine-containing anionic surfactant may be a surfactant which contains a fluorine atom and in which the portions excluding the anionic group have a total carbon number of 20 or less.

The fluorine-containing surfactant may also be a surfactant which contains fluorine and in which the anionic portion has a molecular weight of 800 or less.

The "anionic portion" means a portion of the fluorine-containing surfactant excluding the cation. For example, in the case of $F(CF_2)_{n1}COOM$ represented by the formula (I) to be described later, the portion "$F(CF_2)_{n1}COO$" corresponds to the anionic portion.

Another example of the fluorine-containing surfactant is a fluorine-containing surfactant having a Log POW of 3.5 or lower. The Log POW is a partition coefficient of 1-octanol and water, and is represented by Log P (wherein P is the ratio (concentration of fluorine-containing surfactant in octanol)/(concentration of fluorine-containing surfactant in water) after phase separation of an octanol/water (1:1) liquid mixture containing the fluorine-containing surfactant). The fluorine-containing surfactant is preferably a fluorine-containing surfactant having a Log POW of 3.4 or lower.

The Log POW is calculated as follows. HPLC was performed on standard substances (heptanoic acid, octanoic acid, nonanoic acid, decanoic acid) having known octanol/water partition coefficients under the following conditions, i.e., column: TOSOH ODS-120T column (φ4.6 mm×250 mm, available from Tosoh corp.); eluent: acetonitrile/0.6% by mass HClO4 in water=1/1 (vol/vol %); flow rate: 1.0 mL/min; amount of sample: 300 μL, column temperature: 40° C., detection light: UV 210 nm. A calibration curve was drawn using the respective elution times and known octanol/water partition coefficients. Based on this calibration curve, the Log POW is calculated from the elution time of a sample liquid in HPLC.

Specific examples of the fluorine-containing surfactant include those disclosed in US 2007/0015864 A1, US 2007/0015865 A1, US 2007/0015866 A1, US 2007/0276103 A1, US 2007/0117914 A1, US 2007/142541 A1, US 2008/0015319 A1, U.S. Pat. Nos. 3,250,808, 3,271,341, JP 2003-119204 A, WO 2005/042593, WO 2008/060461, WO 2007/046377, WO 2007/119526, WO 2007/046482, WO 2007/046345, US 2014/0228531 A1, WO 2013/189824, and WO 2013/189826.

An example of the fluorine-containing anionic surfactant is a compound represented by the following formula ($N^0$):

$$X^{n0}—Rf^{n0}—Y^0 \quad (N^0)$$

wherein $X^{n0}$ is H, Cl, or F; $Rf^{n0}$ is a C3-C20 linear, branched, or cyclic alkylene group in which any or all of Hs are replaced by Fs, the alkylene group optionally containing one or more ether bonds and any of Hs optionally being replaced by Cls; and $Y^0$ is an anionic group. The anionic group for $Y^0$ may be —COOM, —$SO_2M$, or —$SO_3M$, and may be —COOM or —$SO_3M$.

M is H, a metal atom, $NR^7_4$, imidazolium optionally having a substituent, pyridinium optionally having a substituent, or phosphonium optionally having a substituent. $R^7$ is H or an organic group.

Examples of the metal atom include alkali metals (Group 1) and alkaline earth metals (Group 2), such as Na, K, and Li.

$R^7$ may be H or a C1-C10 organic group, or may be H or a C1-C4 organic group, or may be H or a C1-C4 alkyl group.

M may be H, a metal atom, or $NR^7_4$, or may be H, an alkali metal (Group 1), an alkaline earth metal (Group 2), or $NR^7_4$, or may be H, Na, K, Li, or $NH_4$.

$Rf^{n0}$ may be a group in which 50% or more of Hs are replaced by fluorine.

Examples of the compound represented by the formula ($N^0$) include:

a compound represented by the following formula ($N^1$):

$$X^{n0}—(CF_2)_{m1}—Y^0 \quad (N^1)$$

wherein $X^{n0}$ is H, Cl, or F; m1 is an integer of 3 to 15; and $Y^0$ is defined as described above;

a compound represented by the following formula ($N^2$):

$$Rf^{n1}—O—(CF(CF_3)CF_2O)_{m2}CFX^{n1}—Y^0 \quad (N^2)$$

wherein $Rf^{n1}$ is a C1-C5 perfluoroalkyl group; m2 is an integer of 0 to 3; $X^{n1}$ is F or $CF_3$; and $Y^0$ is defined as described above;

a compound represented by the following formula ($N^3$):

$$Rf^{n2}(CH_2)_{m3}—(Rf^{n3})_q—Y^0 \quad (N^3)$$

wherein $Rf^{n2}$ is a C1-C13 partially or completely fluorinated alkyl group optionally containing an ether bond; m3 is an integer of 1 to 3; $Rf^{n3}$ is a C1-C3 linear or branched perfluoroalkylene group; q is 0 or 1; and $Y^0$ is defined as described above;

a compound represented by the following formula ($N^4$):

$$Rf^{n4}—O—(CY^{n1}Y^{n2})_pCF_2—Y^0 \quad (N^4)$$

wherein $Rf^{n4}$ is a C1-C12 linear or branched, partially or completely fluorinated alkyl group optionally containing an ether bond; $Y^{n1}$ and $Y^{n2}$ are the same as or different from each other and are each H or F; p is 0 or 1; and $Y^0$ is defined as described above; and a compound represented by the following formula ($N^5$):

[Chem. 1]

($N^5$)

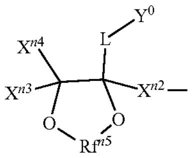

wherein $X^{n2}$, $X^{n3}$, and $X^{n4}$ are the same as or different from each other and are each H, F, or a C1-C6 linear or branched, partially or completely fluorinated alkyl group optionally containing an ether bond; $Rf^{n5}$ is a C1-C3 linear or branched, partially or completely fluorinated alkylene group optionally containing an ether bond; L is a linking group; and $Y^0$ is defined as described above, where the total carbon number of $X^{n2}$, $X^{n3}$, $X^{n4}$, and $Rf^{n5}$ is 18 or smaller.

Specific examples of the compound represented by the formula ($N^0$) include a perfluorocarboxylic acid (I) represented by the following formula (I), an ω-H perfluorocarboxylic acid (II) represented by the following formula (II), a perfluoropolyethercarboxylic acid (III) represented by the following formula (III), a perfluoroalkylalkylenecarboxylic acid (IV) represented by the following formula (IV), a perfluoroalkoxyfluorocarboxylic acid (V) represented by the following formula (V), a perfluoroalkylsulfonic acid (VI) represented by the following formula (VI), an ω-H perfluorosulfonic acid (VII) represented by the following formula (VII), a perfluoroalkylalkylenesulfonic acid (VIII) represented by the following formula (VIII), an alkylalkylenecarboxylic acid (IX) represented by the following formula (IX), a fluorocarboxylic acid (X) represented by the following formula (X), an alkoxyfluorosulfonic acid (XI) represented by the following formula (XI), and a compound (XII) represented by the following formula (XII).

The perfluorocarboxylic acid (I) is represented by the following formula (I):

$$F(CF_2)_{n1}COOM \quad (I)$$

wherein n1 is an integer of 3 to 14; M is H, a metal atom, $NR^7_4$, imidazolium optionally having a substituent, pyridinium optionally having a substituent, or phosphonium optionally having a substituent; and $R^7$ is H or an organic group.

The ω-H perfluorocarboxylic acid (II) is represented by the following formula (II):

$$H(CF_2)_{n2}COOM \quad (II)$$

wherein n2 is an integer of 4 to 15; and M is defined as described above.

The perfluoropolyethercarboxylic acid (III) is represented by the following formula (III):

$$Rf^1—O—(CF(CF_3)CF_2O)_{n3}CF(CF_3)COOM \quad (III)$$

wherein $Rf^1$ is a C1-C5 perfluoroalkyl group; n3 is an integer of 0 to 3; and M is defined as described above.

The perfluoroalkylalkylenecarboxylic acid (IV) is represented by the following formula (IV):

$$Rf^2(CH_2)_{n4}Rf^3COOM \quad (IV)$$

wherein $Rf^2$ is a C1-C5 perfluoroalkyl group; $Rf^3$ is a C1-C3 linear or branched perfluoroalkylene group; n4 is an integer of 1 to 3; and M is defined as described above.

The alkoxyfluorocarboxylic acid (V) is represented by the following formula (V):

$$Rf^4—O—CY^1Y^2CF_2—COOM \quad (V)$$

wherein $Rf^4$ is a C1-C12 linear or branched, partially or completely fluorinated alkyl group optionally containing an ether bond; $Y^1$ and $Y^2$ are the same as or different from each other and are each H or F; and M is defined as described above.

The perfluoroalkylsulfonic acid (VI) is represented by the following formula (VI):

$$F(CF_2)_{n5}SO_3M \quad (VI)$$

wherein n5 is an integer of 3 to 14; and M is defined as described above.

The ω-H perfluorosulfonic acid (VII) is represented by the following formula (VII):

$$H(CF_2)_{n6}SO_3M \quad (VII)$$

wherein n6 is an integer of 4 to 14; and M is defined as described above.

The perfluoroalkylalkylenesulfonic acid (VIII) is represented by the following formula (VIII):

$$Rf^5(CH_2)_{n7}SO_3M \quad (VIII)$$

wherein $Rf^5$ is a C1-C13 perfluoroalkyl group; n7 is an integer of 1 to 3; and M is defined as described above.

The alkylalkylenecarboxylic acid (IX) is represented by the following formula (IX):

$$Rf^6(CH_2)_{n8}COOM \quad (IX)$$

wherein $Rf^6$ is a C1-C13 linear or branched, partially or completely fluorinated alkyl group optionally containing an ether bond; n8 is an integer of 1 to 3; and M is defined as described above.

The fluorocarboxylic acid (X) is represented by the following formula (X):

$$Rf^7—O—Rf^8—O—CF_2—COOM \quad (X)$$

wherein $Rf^7$ is a C1-C6 linear or branched, partially or completely fluorinated alkyl group optionally containing an ether bond; $Rf^8$ is a C1-C6 linear or branched, partially or completely fluorinated alkyl group; and M is defined as described above.

The alkoxyfluorosulfonic acid (XI) is represented by the following formula (XI):

$$Rf^9—O—CY^1Y^2CF_2—SO_3M \quad (XI)$$

wherein $Rf^9$ is a C1-C12 linear or branched, partially or completely fluorinated alkyl group optionally containing an ether bond and optionally containing chlorine; $Y^1$ and $Y^2$ are the same as or different from each other and are each H or F; and M is defined as described above.

The compound (XII) is represented by the following formula (XII):

[Chem. 2]

(XII)

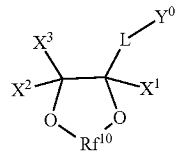

wherein $X^1$, $X^2$, and $X^3$ are the same as or different from each other and are each H, F, or a C1-C6 linear or branched, partially or completely fluorinated alkyl group optionally containing an ether bond; $Rf^{10}$ is a C1-C3 perfluoroalkylene group; L is a linking group; and $Y^0$ is an anionic group.

$Y^0$ may be —COOM, —$SO_2M$, or —$SO_3M$, or may be —$SO_3M$ or COOM, wherein M is defined as described above.

L may be a single bond or a C1-C10 partially or completely fluorinated alkylene group optionally containing an ether bond, for example.

As described above, examples of the fluorine-containing anionic surfactant include a carboxylic acid-based surfactant and a sulfonic acid-based surfactant.

The fluorine-containing surfactant preferably includes at least one selected from the group consisting of a perfluorocarboxylic acid (I) represented by the formula (I), an ω-H perfluorocarboxylic acid (II) represented by the formula (II), a perfluoroalkylsulfonic acid (VI) represented by the formula (VI), and an alkylalkylenecarboxylic acid (IX) represented by the formula (IX). Particularly preferred is a perfluorocarboxylic acid (I) represented by the formula (I). In the formula (I), n1 is more preferably 3 to 6, still more preferably 4 or 5, particularly preferably 5.

In the formula (I), M preferably includes at least one selected from the group consisting of H, an alkali metal atom, and $NH_4$, and is more preferably $NH_4$.

The fluorine-containing surfactant specifically preferably includes at least one selected from the group consisting of $C_5F_{11}COONH_4$ and $C_6F_{13}COONH_4$, and is more preferably $C_5F_{11}COONH_4$.

The fluorine-containing surfactant is preferably in an amount of 0.1 to 40% by mass, more preferably 2 to 30% by mass, still more preferably 5 to 15% by mass, relative to the total amount of a fluorine-containing monomer or of a fluorine-containing monomer and an optional monomer copolymerizable with the fluorine-containing monomer.

The step A includes dispersing a solution containing a fluorine-containing monomer, an optional monomer copolymerizable with the fluorine-containing monomer, an oil-soluble initiator, and a non-polymerizable solvent in water containing a fluorine-containing surfactant.

The solution is preferably a homogeneous solution of a mixture of a fluorine-containing monomer (or a fluorine-containing monomer and a monomer copolymerizable with the fluorine-containing monomer), an oil-soluble initiator, and a non-polymerizable solvent, which can be formed by mixing these components. The mixing may be performed at any temperature, for example about 0° C. to 30° C.

The solution is preferably used in an amount of 1 to 50 parts by mass, preferably 3 to 20 parts by mass, relative to 100 parts by mass of water containing a fluorine-containing surfactant, but the amount is not limited to these ranges.

The dispersion may be performed by a variety of known methods such as dispersion utilizing mechanical shearing force by means of a homogenizer or membrane emulsification. The dispersion may be performed under any temperature condition that is not higher than temperatures having an influence on decomposition of the initiator used. The dispersion temperature is usually about room temperature or lower, particularly preferably about 0° C. to 30° C.

In the above dispersion methods, droplets formed by dispersion of the solution do not have a monodispersed size but are commonly in the form of mixture of droplets having various, different particle sizes. Thus, hollow fine particles finally obtained also have different particle sizes.

Alternatively, a dispersion method may be selected to achieve droplets of a uniform size, thereby obtaining monodispersed droplets. An exemplary method for forming such monodispersed droplets is a method for producing monodispersed droplets by membrane emulsification using porous glass (SPG). In the case of producing monodispersed droplets having such a uniform particle size, hollow fine particles finally obtained also have a uniform, monodispersed particle size.

In each case, the average particle size of the droplets is determined as appropriate in accordance with a desired average particle size of hollow fine particles.

The polymerization in the step A may be performed in conformity with a conventionally known polymerization method such as micro-emulsion polymerization, mini-emulsion polymerization, or micro-suspension polymerization.

The polymerization in the step A may also be suspension polymerization. In the case of using water containing a fluorine-containing surfactant with the above solution dispersed therein for suspension polymerization, this water is heated under stirring.

The heating temperature may be any temperature sufficient for a polymerization initiator to initiate polymerization of a fluorine-containing monomer (and an optional monomer copolymerizable with the fluorine-containing monomer), and is commonly 30° C. to 90° C., particularly preferably 50° C. to 70° C.

The polymerization is performed until desired hollow fine particles are obtained. The duration of polymerization varies in accordance with factors such as the types of a fluorine-containing monomer (and an optional monomer copolymerizable with the fluorine-containing monomer), a polymerization initiator, and a non-polymerizable solvent used, and is commonly about 3 to 24 hours.

The polymerization is preferably performed in an inert gas atmosphere such as nitrogen gas or argon.

Such polymerization allows polymerization of a fluorine-containing monomer (or a fluorine-containing monomer and a monomer copolymerizable with the fluorine-containing monomer) in droplets of a solution containing the fluorine-containing monomer (or the fluorine-containing monomer and the monomer copolymerizable with the fluorine-containing monomer), an oil-soluble initiator, and a non-polymerizable solvent.

The presence of a non-polymerizable solvent promotes phase separation of the resulting polymer, which results in formation of a single layer shell, i.e., a shell formed from a fluorine-containing resin containing a polymerized unit based on a fluorine-containing monomer (or a polymerized unit based on a fluorine-containing monomer and a polymerized unit based on a monomer copolymerizable with the fluorine-containing monomer). On the other hand, the core in the form of hollow contains the non-polymerizable solvent therein.

The hollow fine particles thus obtained in the form of dispersion may be used as it is. Alternatively, the dispersion may be filtered, optionally followed by washing with water, whereby the resulting hollow fine particles in the form of powder can be fed to a variety of applications.

The hollow fine particles in the form of dispersion or powder may be further converted into a form in which the non-polymerizable solvent is removed, which can be fed to a variety of applications. Thus, the method for producing hollow fine particles of the disclosure preferably includes a step B of removing the non-polymerizable solvent from the resulting hollow fine particles.

The step B may be performed by any method capable of removing the non-polymerizable solvent present in the hollow. Examples thereof include heating the hollow fine particles containing the non-polymerizable solvent inside the hollows, causing natural evaporation of the non-polymerizable solvent, and decompression. From the viewpoints of easiness and economic efficiency, heating removal is preferred. The heating temperature may be set as appropriate in accordance with factors such as the non-polymerizable solvent. Preferred is heating at a temperature of 20° C. to 300° C. and at a pressure of about 1 to 100000 Pa.

In the disclosure, the "hollow" of the hollow fine particles means not only the case where the air exists in the hollow but also the case where components such as the non-polymerizable solvent exist in the hollow.

The above structure allows the production method of the disclosure to produce hollow fine particles containing a fluorine-containing resin and having a large average particle size, i.e., having an average particle size of 70 nm or greater and 10 μm or smaller.

The production method of the disclosure can produce the hollow fine particles of the disclosure as described below.

The hollow fine particles of the disclosure contain a fluorine-containing resin and have an average particle size of 70 nm or greater and 10 μm or smaller. The hollow fine particles of the disclosure each preferably include a shell containing the fluorine-containing resin and a hollow and have a single-hole structure.

The "single-hole structure" as used herein does not mean a structure having multiple holes, such as a porous structure, but means a structure having a single closed hole. In the following description, the portion other than the hole of each hollow fine particle is referred to as a "shell".

The hollow fine particles each including a shell that contains a fluorine-containing resin and a hollow and having a single-hole structure can be produced by selecting the type of the non-polymerizable solvent in the production method of the disclosure. For example, with regard to the combination of the resulting fluorine-containing resin and a solvent, a completely non-miscible system leads to a single-hole structure.

The particle sizes of the hollow fine particles of the disclosure can be adjusted by changing the sizes of the droplets in the aforementioned production method. Conventional methods fail to provide an increased average particle size for hollow fine particles containing a fluorine-containing resin.

The aforementioned production method of the disclosure allows hollow fine particles even containing a fluorine-containing resin to have an increased average particle size, and thus can produce hollow fine particles having an average particle size of 70 nm or greater and 10 μm or smaller.

The hollow fine particles of the disclosure preferably have an average particle size of 75 nm or greater, more preferably 80 nm or greater, still more preferably 90 nm or greater. The average particle size is preferably 5 μm or smaller, more preferably 2 μm or smaller, still more preferably 1 μm or smaller.

The average particle size is a value determined by dynamic light scattering (DLS).

The hollow fine particles of the disclosure preferably satisfy that the hollow has a hollow diameter of 10 to 8000 nm. The hollow diameter of the hollow is more preferably 20 nm or greater, still more preferably 50 nm or greater, while preferably 2000 nm or smaller, more preferably 1000 nm or smaller, still more preferably 500 nm or smaller, particularly preferably 200 nm or smaller.

The hollow diameter of the hollow is calculated by image analysis on a TEM image of hollow fine particles using particle size analysis software LUZEX AP as follows. About 200 hollow fine particles in the TEM image are randomly extracted and the inner radius (R1) of each particle was measured. The hollow diameter of the hollow is then calculated by the following formula.

$$\text{Hollow diameter of hollow} = R1 \times 2$$

The hollow fine particles of the disclosure preferably satisfy that the shell has a thickness of 1000 nm or smaller. The shell thickness is more preferably 200 nm or smaller, still more preferably 100 nm or smaller, particularly preferably 50 nm or smaller. A small shell thickness can lead to a high porosity, resulting in hollow fine particles having a lower permittivity.

From the viewpoint of strength of the hollow fine particles, the shell thickness is preferably 2 nm or greater, more preferably 5 nm or greater.

The shell thickness is calculated by image analysis on a TEM image of hollow fine particles using particle size analysis software LUZEX AP as follows. About 200 hollow fine particles in the TEM image are randomly extracted, and the inner radius (R1) and outer radius (R2) of each particle are measured. The shell thickness is then calculated by the following formula.

$$\text{Shell thickness} = R2 - R1$$

The hollow fine particles of the disclosure each preferably have a porosity of 5% by volume or higher. The porosity is more preferably 10% by volume or higher, still more preferably 15% by volume or higher, particularly preferably 25% by volume or higher. Hollow fine particles having a high porosity can have a low relative permittivity and are suitable for the use as electric material. From the viewpoint of strength of the hollow fine particles, the upper limit of the porosity is preferably, but is not limited to, 90% by volume or lower, more preferably 80% by volume or lower.

The porosity is calculated by image analysis on a TEM image of hollow fine particles using particle size analysis software LUZEX AP as follows. About 200 hollow fine particles in the TEM image are randomly extracted, and the inner radius (R1) and outer radius (R2) of each particle are measured. The porosity is then calculated by the following formula.

$$\text{Porosity } (\%)=(R1/R2)^3\times 100$$

The hollow fine particles of the disclosure preferably have a refractive index of 1.4 or lower. The refractive index is more preferably 1.35 or lower, still more preferably 1.3 or lower, particularly preferably 1.25 or lower. The lower limit of the refractive index may be, but is not limited to, 1.1 or higher, for example.

The refractive index is a value determined by the immersion method.

The fluorine-containing resin may consist of a polymerized unit based on a fluorine-containing monomer, or may contain a polymerized unit based on a fluorine-containing monomer and a polymerized unit based on a monomer copolymerizable with the fluorine-containing monomer.

Examples of the monomer copolymerizable with the fluorine-containing monomer include the aforementioned crosslinkable monomers and fluorine-free monomers other than crosslinkable monomers.

In order to strengthen the shell of each hollow fine particle, the fluorine-containing resin preferably contains a polymerized unit based on a fluorine-containing monomer and a polymerized unit based on a crosslinkable monomer. A strengthened shell of a hollow fine particle can lead to a small shell thickness and a high porosity.

Examples of the crosslinkable monomer include those mentioned as examples in the production method of the disclosure. Preferred is a multifunctional monomer having two or more polymerizable double bonds, more preferred are ethylene glycol di(meth)acrylate and divinylbenzene, still more preferred is ethylene glycol di(meth)acrylate.

The fluorine-containing resin contains a polymerized unit based on a crosslinkable monomer in an amount of preferably 5% by mass or more, more preferably 10% by mass or more, still more preferably 30% by mass or more, while preferably 90% by mass or less, more preferably 80% by mass or less, still more preferably 70% by mass or less, of all polymerized units. The presence of a polymerized unit based on a crosslinkable monomer within the above range allows the resulting hollow fine particles to have excellent strength and excellent electric properties.

The fluorine-containing resin contains a polymerized unit based on a fluorine-free monomer in an amount of preferably 0 to 70% by mass, more preferably 0 to 50% by mass, of all polymerized units.

In particular, the fluorine-containing resin is preferably a polymer containing at least one fluorine-containing monomer (a) selected from the group consisting of a fluoroalkyl methacrylate, a 2-fluoro fluoroalkyl acrylate, and a fluoroalkyl acrylate and a crosslinkable monomer (b) based on at least one selected from the group consisting of a di(meth)acrylate, a tri(meth)acrylate, and a divinyl compound.

The fluorine-containing resin preferably has a ratio by mass of a polymerized unit based on the fluorine-containing monomer (a) to a polymerized unit based on the crosslinkable monomer (b) (fluorine-containing monomer/crosslinkable monomer) of 80/20 to 20/80 (ratio by mass), more preferably 70/30 to 30/70 (ratio by mass), still more preferably 60/40 to 40/60 (ratio by mass).

The fluorine-containing resin preferably has a relative permittivity (1 kHz) of 5.0 or lower. The relative permittivity is more preferably 4.0 or lower, still more preferably 3.7 or lower, particularly preferably 3.5 or lower. The lower limit of the relative permittivity may be, but is not limited to, 2 or higher, for example.

The relative permittivity is a value determined by the measurement method in conformity with JIS C2138.

The fluorine-containing resin preferably has a refractive index of 1.40 or lower. The refractive index is more preferably 1.39 or lower, particularly preferably 1.38 or lower. The lower limit of the refractive index may be, but is not limited to, 1.30 or higher, and is preferably 1.35 or higher from the viewpoint of solubility in a non-polymerizable solvent.

The refractive index is a value determined by the immersion method.

The fluorine-containing resin may contain a fluorine-containing surfactant. Examples of the fluorine-containing surfactant include fluorine-containing surfactants mentioned in the aforementioned method for producing hollow fine particles. A production method including the use of a fluorine-containing surfactant, as in the aforementioned method for producing hollow fine particles, can provide hollow fine particles in which the fluorine-containing resin contains a fluorine-containing surfactant.

The fluorine-containing surfactant is preferably contained in an amount of, for example, 50% by mass or less, more preferably 30% by mass or less, still more preferably 20% by mass or less, relative to the fluorine-containing resin.

The amount of the fluorine-containing surfactant may be 1% by mass or more or may be 3% by mass or more relative to the fluorine-containing resin.

From the viewpoints of low dielectricity and low refractive index, the hollow in each of hollow fine particles of the disclosure is preferably a gas, more preferably the air.

The hollow fine particles of the disclosure are hollow and thus have excellently low dielectricity and excellent high-frequency characteristics, so that the hollow fine particles are suitable for the use as electric material. In other words, the hollow fine particles of the disclosure are preferably for the use as electric material.

The hollow fine particles of the disclosure contain a fluorine-containing resin and have an average particle size of 70 nm or greater and 10 μm or smaller. Thus, the hollow fine particles can have a low permittivity and have a smaller area than other particles when they are used at the same volume. Accordingly, the hollow fine particles are suitable for a resin composition to be used as a low dielectric material. A greater average particle size leads to a larger specific surface area, which means that the electric properties will be significantly reduced due to, for example, moisture on the interface.

The disclosure also relates to a resin composition containing an insulating resin with the hollow fine particles of the disclosure dispersed therein. Examples of the insulating resin include, but are not limited to, a fluorine-containing resin, an epoxy resin, a thermosetting modified polyphenylene ether resin, a thermosetting polyimide resin, a silicone resin, a benzoxazine resin, a melamine resin, a urea resin, an allyl resin, a phenol resin, an unsaturated polyester resin, a polyurethane resin, and an aniline resin. Preferred among these are a fluorine-containing resin, an epoxy resin, a thermosetting polyimide resin, a modified polyphenylene ether resin, a thermosetting polyimide resin, a silicone resin, a benzoxazine resin, and a melamine resin. Each of these insulating resins may be used alone, or two or more of these may be used in combination.

The low dielectric material may contain the hollow fine particles in any amount that is set as appropriate in accordance with the properties required for a target application. For example, the amount may be 10 to 90 parts by mass relative to 100 parts by mass of the insulating resin.

Examples of electric material applications with the use of the hollow fine particles of the disclosure and the resin composition of the disclosure include, but are not limited to, printed wiring boards, antenna boards, and interlayer dielectrics of high-frequency connectors.

The hollow fine particles of the disclosure are hollow and thus have excellently low refractivity, so that the hollow fine particles can be applied to a variety of applications requiring a low refractive index. In other words, the hollow fine particles of the disclosure are preferably for the use as low refractive material.

For the use as low refractive material, the hollow fine particles can be suitably used for an anti-reflective film, refractive index adjuster, additive filler for optical adhesive, low refractive index lens material, prism, and the like.

An anti-reflective film can be easily produced by dispersing the hollow fine particles of the disclosure in an appropriate binder to prepare a coating material for an anti-reflective film. The hollow fine particles of the disclosure have a low refractive index and have excellent alkali resistance and excellent dispersibility in a binder. Thus, the resulting anti-reflective film can efficiently reduce reflection on a transparent substrate, can be highly resistant to dirt and cleaning, and can have excellent mechanical strength.

The disclosure also relates to a coating material for an anti-reflective film containing the hollow fine particles of the disclosure and a binder and to an anti-reflective film formed from the hollow fine particles of the disclosure or the coating material for an anti-reflective film of the disclosure.

The coating material for an anti-reflective film of the disclosure contains the hollow fine particles of the disclosure and a binder.

The binder may be any binder that is transparent and is formed from a material capable of forming a film, and both organic material, such as resin, and inorganic material can be used.

Examples of the organic material include cellulose derivatives such as triacetyl cellulose, diacetyl cellulose, propionyl cellulose, butanoyl cellulose, acetyl propionyl cellulose acetate, and nitro cellulose; and polyamide, polycarbonate, polyesters disclosed in JP S48-40414 B (in particular, polyethylene terephthalate, poly-1,4-cyclohexanedimethylene terephthalate, polyethylene 1,2-diphenoxyethane-4,4-dicarboxylate, polybutylene terephthalate, polyethylene naphthalate, and the like), polystyrene, polypropylene, polyethylene, polymethylpentene, polysulfone, polyethersulfone, polyarylate, polyetherimide, polymethyl methacrylate, and relatively low refractive index transparent resins such as fluorine-containing resins derived from these materials.

In the case where the binder used is a transparent resin, the glass transition temperature thereof is preferably lower than the glass transition temperature of the hollow fine particles of the disclosure. Thereby, the binder can serve as a binding agent between hollow fine particles during film formation, resulting in sufficient film strength.

Examples of the inorganic material include alkoxides of various elements, salts of organic acids, and coordination compounds bonded to a coordinating compound. Specific examples thereof include metal alcoholate compounds such as titanium tetraethoxide, titanium tetra-i-propoxide, titanium tetra-n-propoxide, titanium tetra-n-butoxide, titanium tetra-sec-butoxide, titanium tetra-tert-butoxide, aluminum triethoxide, aluminum tri-i-propoxide, aluminum tributoxide, antimony triethoxide, antimony tributoxide, zirconium tetraethoxide, zirconium tetra-i-propoxide, zirconium tetra-n-propoxide, zirconium tetra-n-butoxide, zirconium tetra-sec-butoxide, and zirconium tetra-tert-butoxide; chelate compounds such as di-isopropoxytitanium bisacetylacetonate, di-butoxytitanium bisacetylacetonate, di-ethoxytitanium bisacetylacetonate, bisacetylacetone zirconium, aluminum acetylacetonate, aluminum di-n-butoxide monoethyl acetoacetate, aluminum di-i-propoxide monomethyl acetoacetate, and tri-n-butoxide zirconium monoethyl acetoacetate; and active inorganic polymers mainly containing ammonium zirconile carbonate or zirconium.

The hollow fine particles of the disclosure and the binder may be blended at any ratio. The lower limit of the proportion of the hollow fine particles is preferably 5% by volume and the upper limit thereof is preferably 95% by volume. Less than 5% by volume thereof may fail to give a sufficiently low refractive index to the resulting anti-reflective film. More than 95% by volume thereof may give poor mechanical strength to the resulting anti-reflective film. The lower limit is more preferably 30% by volume and the upper limit is more preferably 90% by volume. The lower limit is still more preferably 50% by volume and the upper limit is still more preferably 80% by volume.

In the case where the binder used is a curable binder, the coating material for an anti-reflective film of the disclosure may be an emulsion in which the hollow fine particles are suspended in the binder. In other cases, it may be diluted in an appropriate volatile solvent.

From the viewpoints of properties of the composition, such as stability, wettability, and volatility, examples of the diluting solvent include, but are not limited to, alcohols such as methanol, ethanol, isopropanol, butanol, and 2-methoxyethanol; ketones such as acetone, methyl ethyl ketone, and methyl isobutyl; esters such as methyl acetate, ethyl acetate, and butyl acetate; ethers such as diisopropyl ether; glycols such as ethylene glycol, propylene glycol, and hexylene glycol; glycol ethers such as ethyl cellosolve, butyl cellosolve, ethyl carbitol, and butyl carbitol; aliphatic hydrocarbons such as hexane, heptane, and octane; halogenated hydrocarbons; aromatic hydrocarbons such as benzene, toluene, and xylene; and N-methylpyrrolidone and dimethylformamide. Each of these diluting solvents may be used alone or two or more of these may be used in combination.

The anti-reflective film of the disclosure can be produced by a method including applying the coating material for an anti-reflective film of the disclosure to a release film or directly to a transparent substrate, followed by drying.

The coating material for anti-reflection of the disclosure may be applied by any method, such as dip coating, spin coating, flow coating, spray coating, roll coating, gravure roll coating, air doctor coating, blade coating, wire doctor coating, knife coating, reverse coating, transfer roll coating, microgravure coating, kiss coating, cast coating, slot orifice coating, calender coating, and die coating.

Application of the coating material for an anti-reflective film of the disclosure to a release film or directly to a transparent substrate is followed by, for example, heating and drying to provide a film. This film is then hardened by, for example, heating, humidification, ultraviolet irradiation, or electron beam irradiation, whereby the anti-reflective film of the disclosure can be obtained.

The anti-reflective film of the disclosure preferably has a smooth surface. The "smooth surface" as used herein means that the surface roughness Rz calculated by the method prescribed in JIS B0601 is 0.2 μm or smaller.

A smooth surface can prevent whiteness of the entire anti-reflective film of the disclosure due to diffuse reflection of light on the surface and can reduce sticking of dirt such as fingerprints, sebum, sweat, and cosmetics to the surface, and enables easy removal of dirt that has stuck to the surface.

In addition to a layer formed from the coating material for an anti-reflective film of the disclosure, the anti-reflective film of the disclosure may further include a base layer. The base layer can improve the mechanical strength of the anti-reflective film of the disclosure, resulting in improved handleability.

The base layer may be any layer that is transparent. From the viewpoints of moldability and mechanical strength, the base layer is preferably formed from a transparent resin that may be used as the binder, for example.

The anti-reflective film of the disclosure may have any thickness. The lower limit thereof is preferably 50 nm and the upper limit thereof is preferably 200 nm. Less than 50 nm thereof may cause insufficient scratch resistance. More than 200 nm thereof may cause easy break of the film.

In the case where the anti-reflective film of the disclosure includes a base layer, the base layer may have any thickness. The lower limit thereof is preferably 3 μm and the upper limit thereof is preferably 7 μm. Less than 3 μm thereof may cause poor strength of the anti-reflective film of the disclosure. More than 7 μm thereof may cause poor transparency of the anti-reflective film of the disclosure, possibly causing difficulty in observing the visual information inside the film.

The disclosure relates to a method for producing hollow fine particles containing a fluorine-containing resin, the method including:

a step A of providing hollow fine particles by dispersing a solution containing a fluorine-containing monomer, an oil-soluble initiator, and a non-polymerizable solvent in water containing a fluorine-containing surfactant and thereby polymerizing the fluorine-containing monomer.

The production method of the disclosure preferably further includes a step B of removing the non-polymerizable solvent from the hollow fine particles obtained in the step A.

Preferably, the solution further contains a crosslinkable monomer, and the step A includes polymerizing the fluorine-containing monomer and the crosslinkable monomer.

The crosslinkable monomer preferably includes a multifunctional monomer containing two or more polymerizable double bonds.

The fluorine-containing monomer preferably includes at least one selected from the group consisting of a fluorine-containing acrylic monomer and a fluorine-containing styrene monomer.

The non-polymerizable solvent preferably includes a C8-C18 saturated hydrocarbon.

The oil-soluble initiator preferably includes an azo compound.

The fluorine-containing surfactant preferably includes a compound represented by the following formula ($N^0$):

$$X^{n0}\text{—}Rf^{n0}\text{—}Y^0 \quad (N^0)$$

wherein $X^{n0}$ is H, Cl, or F; $Rf^{n0}$ is a C3-C20 linear, branched, or cyclic alkylene group in which any or all of Hs are replaced by Fs, the alkylene group optionally containing one or more ether bonds and any of Hs optionally being replaced by Cls; and $Y^0$ is an anionic group.

The hollow fine particles preferably have an average particle size of 70 nm or greater and 10 μm or smaller.

The disclosure also provides hollow fine particles containing a fluorine-containing resin and having an average particle size of 70 nm or greater and 10 μm or smaller.

Preferably, the hollow fine particles of the disclosure each include a shell containing the fluorine-containing resin and a hollow and have a single-hole structure.

The hollow preferably has a hollow diameter of 10 to 8000 nm.

The shell preferably has a thickness of 1000 nm or smaller.

The hollow fine particles of the disclosure each preferably have a porosity of 5% by volume or higher.

The fluorine-containing resin preferably contains a polymerized unit based on a fluorine-containing monomer and a polymerized unit based on a crosslinkable monomer.

The crosslinkable monomer preferably includes a multifunctional monomer containing two or more polymerizable double bonds.

The fluorine-containing resin preferably further contains a fluorine-containing surfactant.

The hollow fine particles of the disclosure are preferably for the use as electric material.

EXAMPLES

The disclosure is described in more detail below with reference to examples, but is not limited to these examples.

The parameters in the examples were measured by the following methods.

Average Particle Size

The average particle size was measured using DLS-7000 available from Otsuka Electronics Co., Ltd.

Shell Thickness of Hollow Fine Particles

The shell thickness was calculated by image analysis on a TEM image of fine particles using particle size analysis software LUZEX AP. About 200 hollow fine particles in the TEM image were randomly extracted, and the inner radius (R1) and outer radius (R2) of each particle were measured. The shell thickness was then calculated by the following formula.

$$\text{Shell thickness} = R2 - R1$$

Porosity of Hollow Fine Particles

The porosity was calculated by image analysis on a TEM image of fine particles using particle size analysis software LUZEX AP. About 200 hollow fine particles in the TEM image were randomly extracted, and the inner radius (R1) and outer radius (R2) of each particle were measured. The porosity was then calculated by the following formula.

$$\text{Porosity (\%)} = (R1/R2)^3 \times 100$$

Example 1

Dissolution was performed using 13FMA as a fluorine-containing monomer, ethylene glycol dimethacrylate (EGDMA) as a crosslinkable monomer, and hexadecane as a non-polymerizable solvent. $C_5F_{11}COO\text{—}NH_4^+$ serving as a fluorine-containing surfactant and water were added thereto and the components were pre-emulsified using a homogenizing mixer. Droplets were then micronized using an ultrasonic emulsifier at room temperature for five minutes. The oil droplet size after emulsification was measured using DLS. Polymerization was performed in the following procedure using a 200-mL four-neck flask as a reaction container. The amounts of the chemicals and the particle size after emulsification are shown in Table 1.

The resulting emulsion was moved to the four-neck flask purged with nitrogen and heated to 70° C. Azobisisobutyronitrile (AIBN) serving as an oil-soluble initiator was added thereto and polymerization was performed for three hours in a nitrogen atmosphere. The product was cooled to room temperature and then filtered twice to remove coagulated particles and insoluble matter. The particle size of the resulting emulsion was measured using DLS. The emulsion was vacuum-dried, whereby hollow fine particles were obtained. The mass change during this procedure was measured and the solid concentration was then calculated.

The resulting hollow fine particles were observed using TEM, and the shell thickness and the porosity were calculated. The refractive index was measured by the immersion method. These parameters are shown in Table 1. The TEM image is shown in FIG. 1.

Examples 2 to 7

Fluorine-containing hollow fine particles were produced using the chemicals in the amounts shown in Table 1. The shell thickness, porosity, and refractive index thereof are also shown in Table 1.

Comparative Example 1

Polymerization was performed as in Example 1 except that hexadecane was not used. The resulting fine particles were not hollow but solid fine particles.

Comparative Example 2

Polymerization was performed under the same conditions as in Example 1 except that the fluorine-containing emulsifier was not used but sodium dodecyl sulfate (SDS) was used. The resulting fine particles were not hollow but solid fine particles.

Comparative Example 3

Polymerization was performed as in Example 1 except that ammonium persulfate (APS) serving as a water-soluble initiator was used instead of the oil-soluble initiator. The polymerization temperature was 54° C. The resulting fine particles were not follow but solid fine particles.

TABLE 1

| | Example 1 | Example 2 | Example 3 | Example 4 | Example 5 | Example 6 | Example 7 | Comparative Example 1 | Comparative Example 2 | Comparative Example 3 |
|---|---|---|---|---|---|---|---|---|---|---|
| Initiator | AIBN | AIBN | AIBN | AIBN | AIBN | AIBN | AIBN | AIBN | AIBN | APS |
| Amount of initiator (g) | 0.48 | 0.48 | 0.48 | 0.48 | 0.48 | 0.48 | 0.48 | 0.48 | 0.48 | 0.48 |
| Type of non-polymerizable solvent | Hexadecane | Dodecane | Hexadecane | Hexadecane | Hexadecane | Hexadecane | Hexadecane | None | Hexadecane | Hexadecane |
| Amount of non-polymerizable solvent (g) | 6 | 6 | 6 | 6 | 6 | 6 | 3 | 0 | 6 | 6 |
| Type of fluorine-containing surfactant | $C_5F_{11}COONH_4$ | $C_3F_7OC_3F_6O$ $CF(CF_3)COONH_4$ | $C_5F_{11}COONH_4$ | $C_5F_{11}COONH_4$ | $C_5F_{11}COONH_4$ | $C_5F_{11}COONH_4$ | $C_5F_{11}COONH_4$ | $C_5F_{11}COONH_4$ | — | $C_5F_{11}COONH_4$ |
| Amount of fluorine-containing surfactant (g) | 0.6 | 0.6 | 0.6 | 0.3 | 0.15 | 0.45 | 0.6 | 0.3 | — | 0.6 |
| Type of fluorine-free surfactant | — | — | — | SDS | SDS | SDS | — | — | SDS | — |
| Amount of fluorine-free surfactant (g) | — | — | — | 0.3 | 0.45 | 0.15 | — | — | 0.6 | — |
| Type of fluorine-containing monomer | 13FMA | 13FMA | 6FNP-MA | 13FMA | 13FMA | 13FMA | 13FMA | 13FMA | 13FMA | 13FMA |
| Amount of fluorine-containing monomer (g) | 3 | 3 | 3 | 3 | 3 | 3 | 3 | 3 | 3 | 3 |
| Type of crosslinkable monomer | EGDMA | EGDMA | EGDMA | EGDMA | EGDMA | EGDMA | EGDMA | EGDMA | EGDMA | EGDMA |
| Amount of crosslinkable monomer (g) | 3 | 3 | 3 | 3 | 3 | 3 | 3 | 3 | 3 | 3 |
| Amount of water (g) | 107 | 107 | 107 | 107 | 107 | 107 | 107 | 107 | 107 | 107 |
| Particle size after emulsification (nm) | 154 | 133 | 158 | 182 | 163 | 192 | 153 | 288 | 250 | 196 |
| Particle size after polymerization (nm) | 85 | 120 | 100 | 189 | 175 | 189 | 166 | 323 | 237 | 218 |
| Solid concentration (%) | 3.9 | 8.1 | 11.0 | 10.7 | 10.7 | 10.5 | 11.8 | 11.3 | 11.1 | 7.5 |
| Shell thickness (nm) | 14 | 15 | 15 | 17 | 15 | 16 | 13 | — | — | — |
| Porosity (%) | 30 | 42 | 34 | 55 | 56 | 60 | 30 | — | — | — |
| Refractive index | 1.29 | 1.29 | 1.28 | 1.2 | 1.19 | 1.18 | 1.30 | 1.43 | 1.43 | 1.43 |

Example 8

The emulsion of hollow fine particles obtained in Example 1 was blended in an aqueous manner with a water-based coating material ZEFFLE SE405 available from Daikin Industries, Ltd. Thereby, a coating material containing hollow fine particles in the proportion shown in Table 2 was obtained. This coating material was then applied to a microscope slide by bar coating, followed by drying at 40° C. for two hours, at 70° C. for three hours, and at 150° C. for three hours. Thereby, a film was obtained. The refractive index of this film was measured using an Abbe refractometer.

The amount (% by mass) of the hollow fine particles added relative to the solid content of the coating material and the refractive index of the film are shown in Table 2. The table clearly demonstrates that the refractive index decreased as the amount of the hollow fine particles increased.

TABLE 2

| Amount of hollow fine particles added (% by mass relative to solid content of coating material) | Refractive index |
|---|---|
| 0 | 1.430 |
| 7.4 | 1.422 |
| 9.1 | 1.418 |
| 16.7 | 1.389 |

Example 9

To 100 parts by mass of bisphenol A epoxy (Epikote 828) was added 3 parts by mass of a boron trifluoride monoethyl amine complex, and they were dissolved in methyl ethyl ketone. Thereby, a 10% solution (varnish) was prepared. The vacuum-dried hollow fine particles obtained in Example 1 were added to this varnish such that the amount thereof was 50% by mass relative to the epoxy resin. This varnish was impregnated into glass cloth (made of D-glass) and dried in the air at 90° C. to 100° C. for 20 minutes, whereby a prepreg was obtained. Eight sheets of this prepreg were stacked and compressed at 130° C. for 30 minutes, then at 190° C. for 80 minutes, whereby a laminate was produced.

Comparative Example 4

A laminate was produced as in Example 9 except that the hollow fine particles were not added.

Comparative Example 5

A laminate was produced as in Example 9 except that the solid fine particles obtained in Comparative Example 1 were added in the same amount instead of the hollow fine particles obtained in Example 1.

The following Table 3 shows the dielectric properties of the laminates obtained in Example 9, Comparative Example 4, and Comparative Example 5.

TABLE 3

| | 10 kHz | | 100 kHz | | 12 GHz | |
|---|---|---|---|---|---|---|
| | Permittivity | Dielectric loss | Permittivity | Dielectric loss | Permittivity | Dielectric loss |
| Example 9 | 4 | 5.00E−03 | 3.9 | 1.00E−02 | 3.5 | 1.50E−02 |
| Comparative Example 4 | 5.1 | 9.00E−03 | 5 | 1.50E−02 | 4.1 | 2.00E−02 |
| Comparative Example 5 | 4.4 | 7.00E−03 | 4.3 | 1.40E−02 | 3.9 | 1.80E−02 |

Example 10

Figure 2:
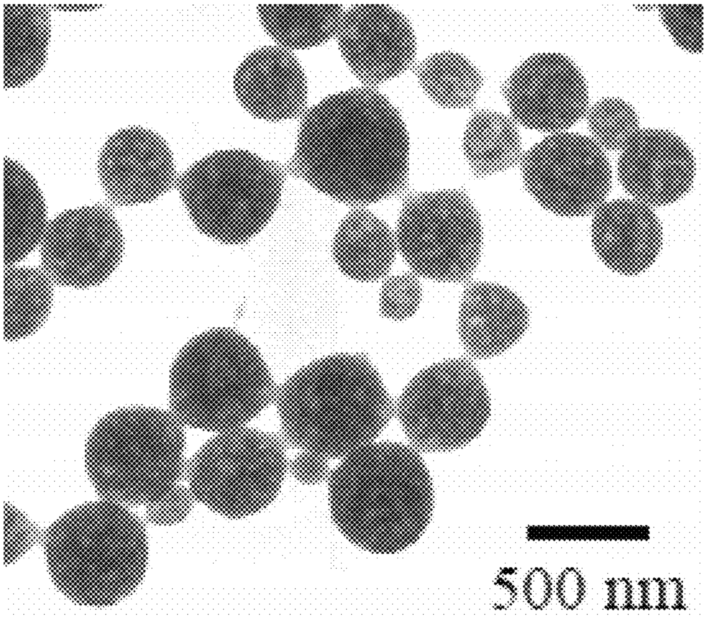
FIG. 2 is a TEM image of hollow fine particles obtained in Example 10.

Polymerization was performed as in Example 1 except that the non-polymerizable solvent used was toluene instead of hexadecane. FIG. 2 shows a TEM image of the resulting fine particles. The figure clearly shows that the particles had a porous structure. This demonstrates that a porous structure was able to be produced as a result of changing the type of the non-polymerizable solvent.

What is claimed is:

1. Hollow fine particles comprising a fluorine-containing resin and having an average particle size of 120 nm or greater and 10 μm or smaller,
wherein the hollow fine particles each have a porosity of 5% by volume or higher,
the fluorine-containing resin contains a polymerized unit based on a fluorine-containing acrylic monomer, a polymerized unit based on a crosslinkable monomer, and a fluorine-containing anionic surfactant, and
the hollow fine particles each include a shell containing the fluorine-containing resin and a hollow and have a single-hole structure.

2. The hollow fine particles according to claim 1,
wherein the hollow has a hollow diameter of 10 to 8000 nm.

3. The hollow fine particles according to claim 1,
wherein the crosslinkable monomer comprises a multifunctional monomer containing two or more polymerizable double bonds.

4. The hollow fine particles according to claim 1 for use as electric material.

5. The hollow fine particles according to claim 1,
wherein the fluorine-containing resin contains a polymerized unit based on a fluorine-free monomer in an amount of 0 to 70% by mass of all polymerized units.

6. The hollow fine particles according to claim 1,
wherein the fluorine-containing acrylic monomer is at least one selected from the group consisting of a fluoroalkyl acrylate, a fluoroalkyl methacrylate, a 2-fluoro fluoroalkyl acrylate, and a 2-chloro fluoroalkyl acrylate.

7. A method for producing the hollow fine particles according to claim 1, the method comprising
a step A of providing hollow fine particles by dispersing a solution containing a fluorine-containing monomer, a crosslinkable monomer, an oil-soluble initiator, and a non-polymerizable solvent in water containing a fluorine-containing surfactant and thereby polymerizing the fluorine-containing monomer,
wherein the non-polymerizable solvent is a C12-C18 saturated hydrocarbon.

8. The production method according to claim 7, further comprising a step B of removing the non-polymerizable solvent from the hollow fine particles obtained in the step A.

9. The production method according to claim 7, wherein the step A includes polymerizing the fluorine-containing monomer and the crosslinkable monomer.

10. The production method according to claim 7, wherein the crosslinkable monomer comprises a multi-functional monomer containing two or more polymerizable double bonds.

11. The production method according to claim 7, wherein the fluorine-containing monomer further comprises a fluorine-containing styrene monomer.

12. The production method according to claim 7, wherein the fluorine-containing surfactant comprises a compound represented by the following formula ($N^0$):

$$X^{n0}—Rf^{n0}—Y^0 \quad (N^0)$$

wherein $X^{n0}$ is H, Cl, or F; $Rf^{n0}$ is a C3-C20 linear, branched, or cyclic alkylene group in which any or all of Hs are replaced by Fs, the alkylene group optionally containing one or more ether bonds and any of Hs optionally being replaced by Cls; and $Y^0$ is an anionic group.

* * * * *